United States Patent
Tanaka et al.

(10) Patent No.: US 7,986,866 B2
(45) Date of Patent: Jul. 26, 2011

(54) REPRODUCTION DEVICE AND PROGRAM

(75) Inventors: Keiichi Tanaka, Hyogo (JP); Masahiro Oashi, Kyoto (JP); Hidetaka Ohto, Hyogo (JP); Hiroaki Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1301 days.

(21) Appl. No.: 10/597,614

(22) PCT Filed: Jun. 2, 2005

(86) PCT No.: PCT/JP2005/010142
§ 371 (c)(1),
(2), (4) Date: Aug. 1, 2006

(87) PCT Pub. No.: WO2005/119675
PCT Pub. Date: Dec. 15, 2005

(65) Prior Publication Data
US 2008/0145031 A1    Jun. 19, 2008

(30) Foreign Application Priority Data
Jun. 3, 2004    (JP) ................................. 2004-165502

(51) Int. Cl.
*H04N 9/80* (2006.01)
*H04N 5/783* (2006.01)
(52) U.S. Cl. ........................................ 386/248; 386/343
(58) Field of Classification Search .......... 386/1, 45–46, 386/125–126
See application file for complete search history.

(56) References Cited

U.S. PATENT DOCUMENTS

| | | | |
|---|---|---|---|
| 4,873,584 A * | 10/1989 | Hashimoto | 386/83 |
| 6,057,833 A | 5/2000 | Heidmann et al. | |
| 6,072,503 A | 6/2000 | Tani et al. | |
| 6,360,053 B1 * | 3/2002 | Wood et al. | 386/67 |
| 6,735,738 B1 | 5/2004 | Kojima | |
| 7,206,892 B2 * | 4/2007 | Kim et al. | 711/100 |
| 7,672,566 B2 * | 3/2010 | Seo et al. | 386/55 |
| 2002/0194618 A1 | 12/2002 | Okada et al. | |
| 2006/0140091 A1 | 6/2006 | Iwamoto et al. | |
| 2006/0143666 A1 | 6/2006 | Okada et al. | |

FOREIGN PATENT DOCUMENTS

| | | |
|---|---|---|
| EP | 1551027 | 7/2005 |
| JP | 2002-369154 | 12/2002 |
| JP | 2003-007035 | 1/2003 |
| JP | 2004-128871 | 4/2004 |
| JP | 2004-128872 | 4/2004 |
| WO | 2004/025651 | 3/2004 |

OTHER PUBLICATIONS

English Language abstract of JP 2004-128872.
English language Abstract of JP 2002-369154.

(Continued)

*Primary Examiner* — Thai Tran
*Assistant Examiner* — Nigar Chowdhury
(74) *Attorney, Agent, or Firm* — Greenblum & Bernstein, P.L.C.

(57) ABSTRACT

A playback device plays back a digital stream and executes an application. A Java™ module is a platform unit, executes the application, and performs playback control based on a result of the execution. When performing this playback, the playback device has a plurality of real parameters specific to the playback device, for the playback control. The Java™ module provides a function using a real parameter to the application, in response to a method call from the application.

11 Claims, 18 Drawing Sheets

OTHER PUBLICATIONS

English language Abstract of JP 2004-128871.
English language Abstract of JP 2003-007035.
U.S. Appl. No. 10/596,107 to Hashimoto et al., which was filed May 31, 2006.
U.S. Appl. No. 10/596,109 to Tanaka et al., which was filed May 31, 2006.
U.S. Appl. No. 11/568,555 to Hashimoto et al., which was filed Nov. 1, 2006.

* cited by examiner

NORMAL PLAYBACK IN DVD-LIKE MODE

ENHANCEMENT OF ADDED VALUE IN Java(TM) MODE

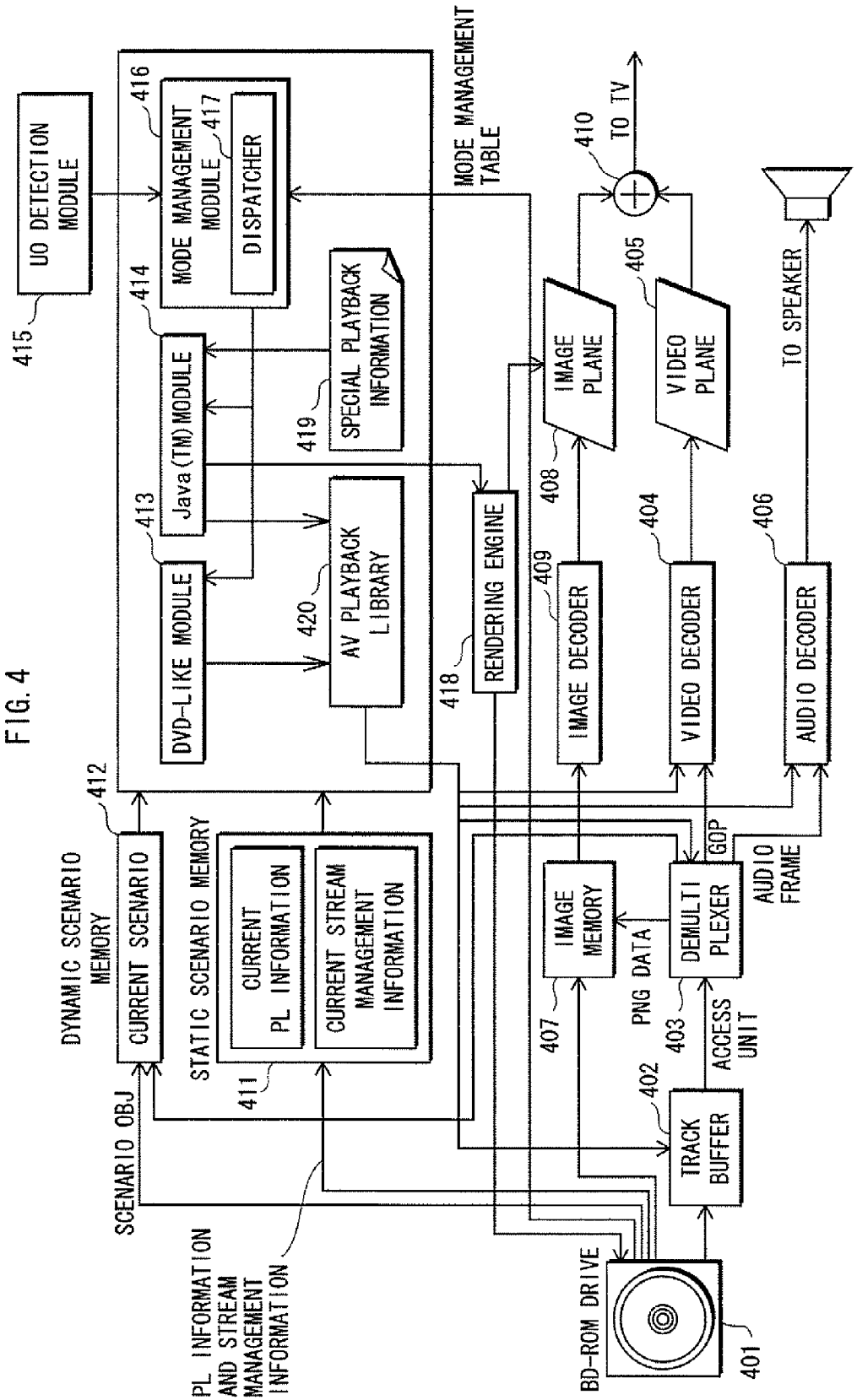

FIG. 6

SPECIAL PLAYBACK INFORMATION

FAST-FORWARD PLAYBACK

| SPECIAL PLAYBACK OPERATION IN DVD-LIKE MODE | | TERMINAL SUPPORT RATE |
|---|---|---|
| ID OF CORRESPONDING BUTTON | PUSHING COUNT OF BUTTON | |
| FAST-FORWARD#1 | 1 | 2.0 |
| — | — | 10.0 |
| FAST-FORWARD#1 | 2 | 30.0 |
| — | — | 60.0 |
| FAST-FORWARD#1 | 3 | 120.0 |

FAST-BACKWARD PLAYBACK

| SPECIAL PLAYBACK OPERATION IN DVD-LIKE MODE | | TERMINAL SUPPORT RATE |
|---|---|---|
| ID OF CORRESPONDING BUTTON | PUSHING COUNT OF BUTTON | |
| FAST-BACKWARD#1 | 1 | -2.0 |
| — | — | -10.0 |
| FAST-BACKWARD#1 | 2 | -30.0 |
| — | — | -60.0 |
| FAST-BACKWARD#1 | 3 | -120.0 |

SLOW-FORWARD PLAYBACK

| SPECIAL PLAYBACK OPERATION IN DVD-LIKE MODE | | TERMINAL SUPPORT RATE |
|---|---|---|
| ID OF CORRESPONDING BUTTON | PUSHING COUNT OF BUTTON | |
| SLOW#1 | 1 | 0.5 |
| — | — | 0.1 |
| SLOW#1 | 2 | 0.01 |

SLOW-BACKWARD PLAYBACK

| SPECIAL PLAYBACK OPERATION IN DVD-LIKE MODE | | TERMINAL SUPPORT RATE |
|---|---|---|
| ID OF CORRESPONDING BUTTON | PUSHING COUNT OF BUTTON | |
| SLOW#2 | 1 | -0.5 |
| — | — | -0.1 |
| SLOW#2 | 2 | -0.01 |

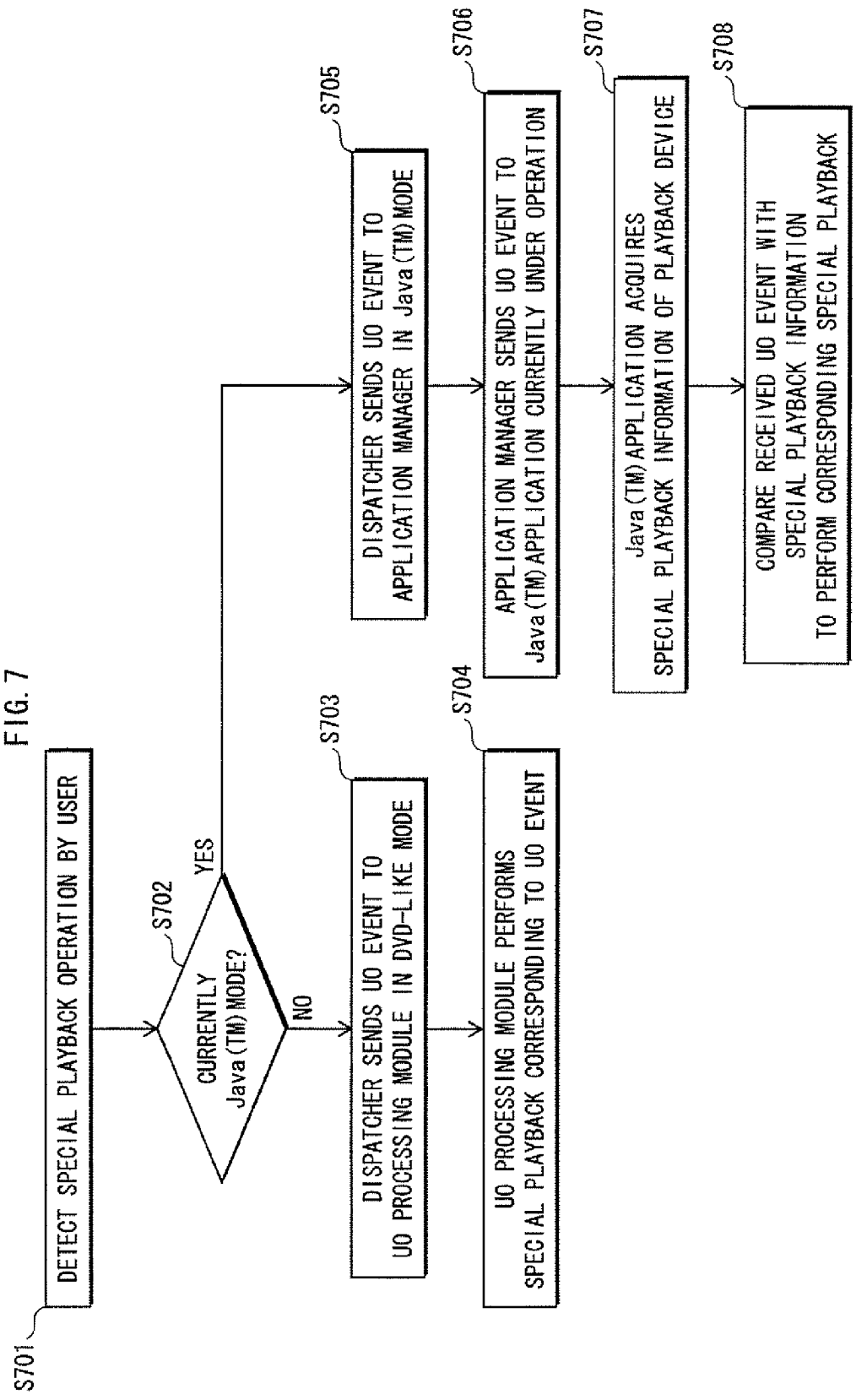

FIG. 13

CROSS-APPLICATION SPECIAL PLAYBACK INFORMATION

FAST-FORWARD PLAYBACK

| VARIABLE NAME | PLAYBACK RATE |
|---|---|
| LITTLE_FAST_FORWARD | 2.0 |
| FAST_FORWARD | 30.0 |
| VERY_FAST_FORWARD | 120.0 |

FAST-BACKWARD PLAYBACK

| VARIABLE NAME | PLAYBACK RATE |
|---|---|
| LITTLE_FAST_BACKWARD | -2.0 |
| FAST_BACKWARD | -30.0 |
| VERY_FAST_BACKWARD | -120.0 |

SLOW-FORWARD PLAYBACK

| VARIABLE NAME | PLAYBACK RATE |
|---|---|
| LITTLE_SLOW_FORWARD | 0.5 |
| SLOW_FORWARD | 0.1 |
| VERY_SLOW_FORWARD | 0.01 |

SLOW-BACKWARD PLAYBACK

| VARIABLE NAME | PLAYBACK RATE |
|---|---|
| LITTLE_SLOW_BACKWARD | -0.5 |
| SLOW_BACKWARD | -0.1 |
| VERY_SLOW_BACKWARD | -0.01 |

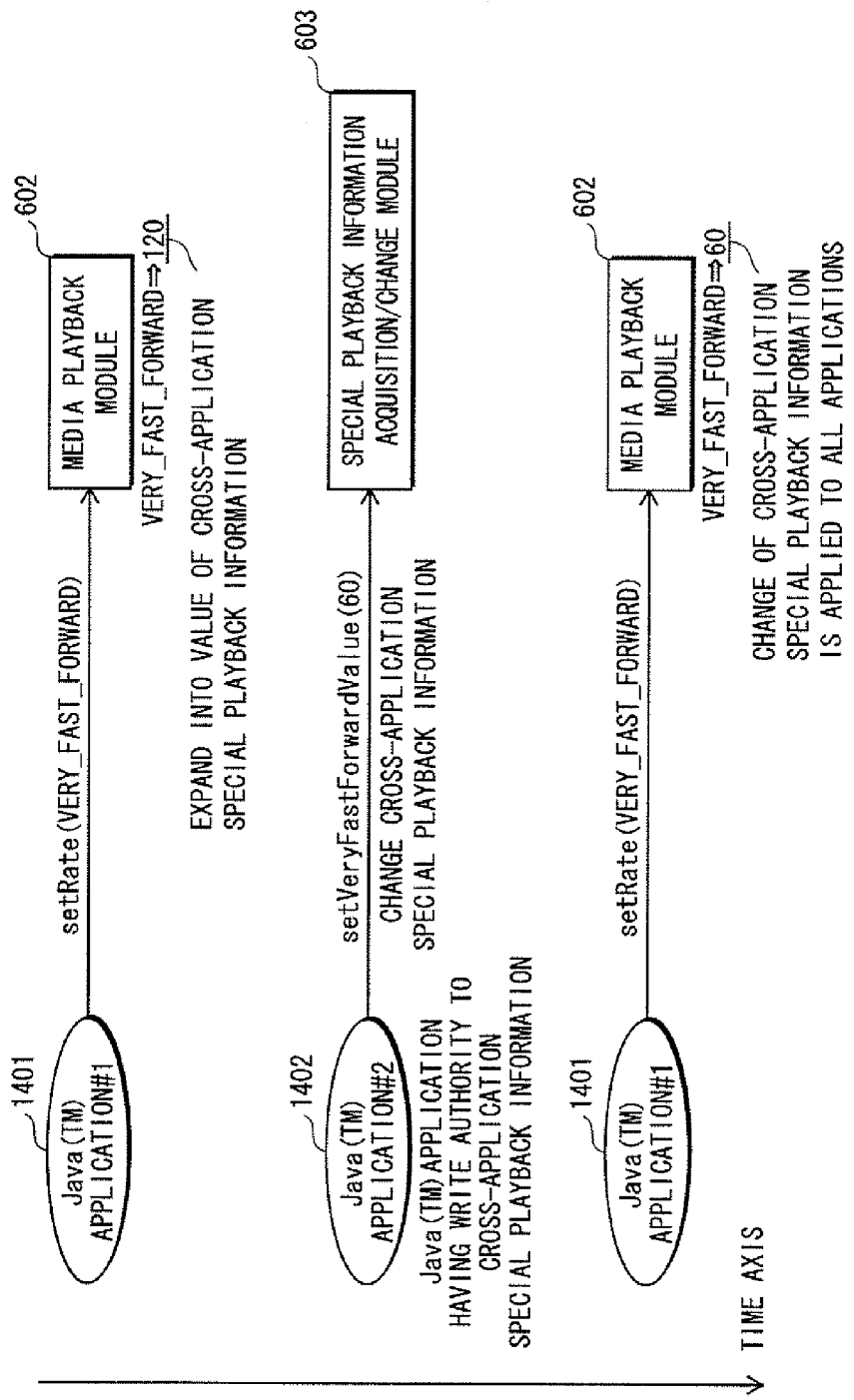

REPRODUCTION DEVICE AND PROGRAM

TECHNICAL FIELD

The present invention belongs to a technical field of reading control for a recording medium.

BACKGROUND ART

A reading control technique is a technique of reading a digital stream recorded on a recording medium such as a BD-ROM at a desired rate, for example, at 4 times or 8 times, and supplying the read digital stream to a decoder.

Generally, a program for realizing this control is stored in a playback device as a built-in program. However, such a control program which is recorded on a BD-ROM and supplied to a playback device will become widespread in a near future, in order to produce a movie with a video stream being played back in conjunction with an application. The producing of the movie work will be described below.

When producing the movie work, an application using video data is recorded on a recording medium having the video data recorded thereon. Upon start-up by a playback device, the application sets a character in motion next to the video data being played on a screen. By making such an application to apply to a game or a quiz, an added value of the movie work will be enhanced greatly.

In such interactive control, adjustment of a video playback rate by the control program on the BD-ROM can speed up or slow down the motion of the character while playing back the video. By recording this control program on the BD-ROM for playback in the playback device, an interactive application in close conjunction with video can be distributed. As a result, the added value of the movie work can be further enhanced. Conventional techniques relating to adjustment of a playback rate include a known technology disclosed in the following Patent Document 1.

Patent Document 1: Japanese Patent Application Publication No. 2003-7035

DISCLOSURE OF THE INVENTION

The Problems the Invention is Going to Solve

When a manufacturer of the playback device makes this control program, it is unlikely for playback control to be specified regardless of the drive performance of the playback device. That is, a technician of the manufacturer fully takes into consideration the drive performance of the playback device to make the control program.

However, if a third party other than the manufacturer, such as a movie producer, makes a control program, there is a possibility that playback control is specified with no consideration of the drive performance of the playback device.

Various playback devices having different drive performances are distributed in a consumer equipment market. It is assumed that a drive device with high performance is built in a high-priced playback device, whereas a drive device with low performance is built in a low-priced playback device. If the third party such as the movie producer makes a control program, the control program instructs the playback device to perform reading with no consideration of this drive performance difference between playback devices. This frequently causes problems, such as a malfunction and a trouble.

If the playback device has an approximate function, these problems may be prevented. When the control program instructs reading at a rate exceeding the drive performance of the playback device, the approximate function is operable to replace the required rate with a rate that the device can support, and then instruct control on a drive device built in the playback device. Supposed that the application requests playback at rates of 4 times, 8 times, 16 times, and 32 times. If the rates that the playback device can support are twice and 4 times, all the rates exceeding 8 times are approximated to 4 times. However, when the application renders the character to move (or change) at a high rate in close conjunction with the video in expectation of playback at rates of 4 times, 8 times, and 16 times, the video is played at the approximated same rate (4 times in the above example) by the drive device regardless of the rates specified by the application. If this mismatch occurs, a motion of the character rendered by the application becomes unusually faster than a motion of the video played back by the playback device. If the character is superimposed on the video and presented for display, the display image will end up being inconsistent as a whole. The mismatch between the motion by rendering by the application and the motion of the video is undesirable for both a provider of the movie work and the manufacturer of the playback device.

The present invention aims to provide a playback device that can, when playing back a digital stream recorded on a recording medium under control of an application recorded on the recording medium, control the playback of the digital stream in accordance with its own performance.

The present invention further aims to provide a playback device that can maintain synchronization of playback of video and rendering by an application, regardless of drive performance differences between playback devices.

Means to Solve the Problems

In order to solve the above problems, the present invention is a playback device for playing back a digital stream and an application which are recorded on a recording medium, in conjunction with each other, including: a playback unit operable to play back the digital stream; and a platform unit operable to execute the application to perform playback control, the playback unit has a plurality of real parameters used for the playback control, the plurality of real parameters being specific to the playback device, the platform unit includes: an execution unit operable to interpret and execute the application; and a module unit having a function to be provided to the application, and operable to perform the playback control, and the playback control causes, via the function, the playback unit to play back the digital stream based on one of the plurality of real parameters.

Effect of the Invention

An application can have a platform unit (specifically, a module unit) execute a function using a real parameter by performing a function call. The function executed by the platform unit is based on a device-specific real parameter. Thus, playback control at a low rate multiplication factor is performed in a playback device with low performance, whereas playback control at a high rate multiplication factor is performed in a playback device with high performance.

By realizing special playback using this function, a control failure, such as playback at a rate unsupported by the playback device, can be prevented.

Thus, even if there is a large variation in drive performances of playback devices distributed in the market and an approximate function operates in the playback devices, the application can realize playback control in accordance with each drive performance of the playback devices.

On the other hand, if a function provided from the module unit passes the real parameter to the application, the application can acquire a multiplication factor supported by the playback device. By controlling rendering of the character based on the acquired multiplication factor, even if the drive performances differ between the playback devices, the motion of the character rendered by the application and the video played back by the playback device cannot be mismatched. And if the character is superimposed on the video presented for display, the display image will not end up being inconsistent as a whole. By resolving this mismatch, the interactive control can be realized in the form that the motion of the character rendered by the application is in close conjunction with the playback of the digital stream by the playback device.

BRIEF DESCRIPTION OF THE DRAWINGS

FIG. 4 shows an internal structure of a playback device in the first embodiment of the present invention;

FIG. 6 shows special playback information retained in the playback device in the first embodiment of the present invention;

FIG. 7 is a flowchart showing special playback processing triggered with a user operation in the first embodiment of the present invention;

FIG. 13 shows cross-application special playback information in the second embodiment of the present invention;

FIG. 14 shows an influence that is exercised on the Java™ application by a change of the cross-application special playback information in the second embodiment of the present invention;

DESCRIPTION OF CHARACTERS

Figure 1:
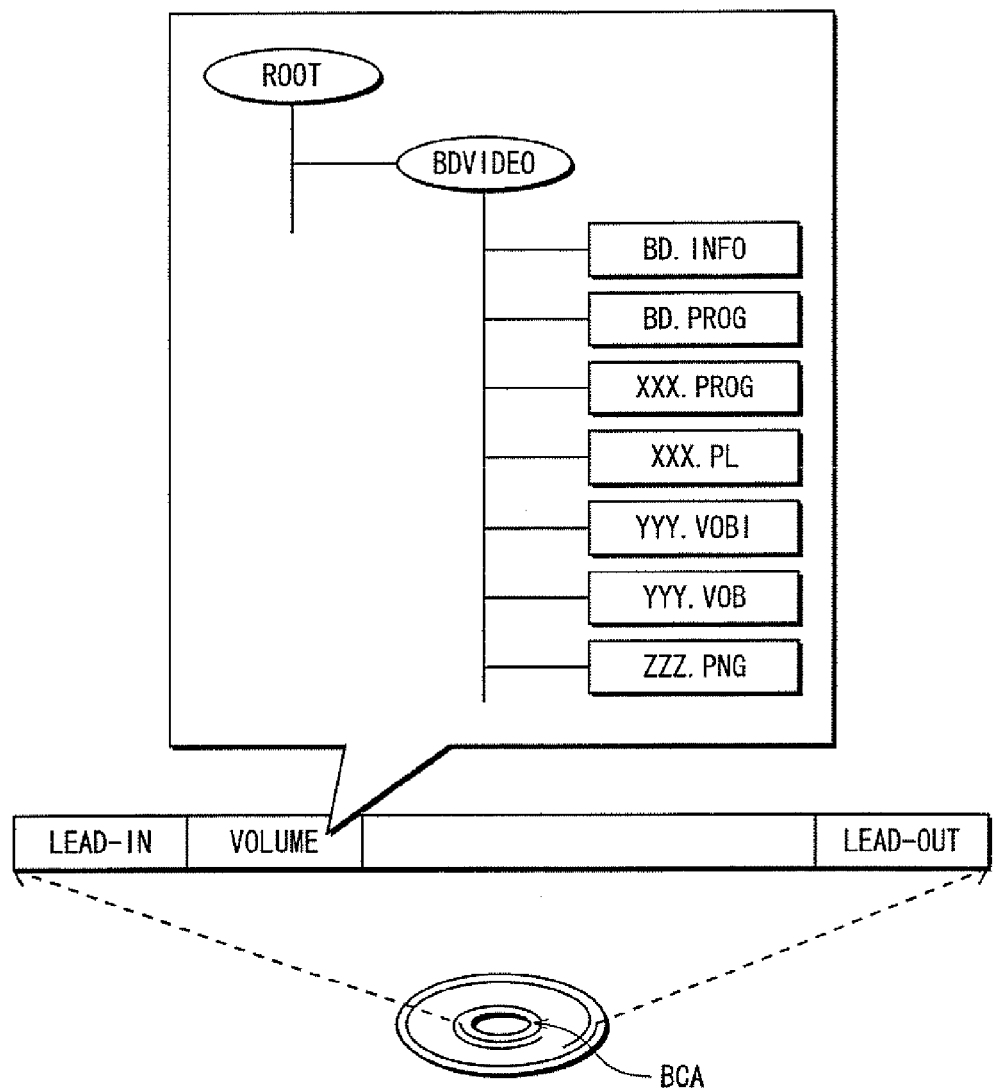
FIG. 1 shows a data hierarchy of a BD-ROM in a first embodiment of the present invention.

401: BD-ROM drive
402: track buffer
403: demultiplexer
404: video decoder
405: video plane
406: audio decoder
407: image memory
408: image plane
409: image decoder
410: adder
411: static scenario memory
412: dynamic scenario memory
413: DVD-like module
414: Java™ module
415: UO detection module
416: mode management module
417: dispatcher
418: rendering engine
419: special playback information
420: AV playback library
501: scenario program
502: scenario control module
503: UO processing module
504: application manager
505: Java™ application
506: special playback information acquisition module
507: media playback module
601: Java™ application
602: media playback module
603: special playback information acquisition/change module
604: cross-application special playback information
1401: Java™ application
1402: Java™ application
1501: UO processing module
1502: cross-mode special playback information
1503: media playback module
1504: special playback information acquisition/change module
1505: Java™ application
1601: dispatcher module
3001: recording medium
3002: disc control unit
3003: separation unit
3004: video processing unit
3005: audio processing unit
3006: VR navigation processing unit
S701: user operation detection step
S702: mode judgment step
S703: step for sending UO event to DVD-like module
S704: UO event processing step
S705: step for sending UO event to Java™ module
S706: step for sending UO event to Java™ application
S707: special playback information acquisition step
S708: special playback processing step
S1101: special playback request step
S1102: rate specification method judgment step
S1103: special playback information acquisition step
S1104: immediate value expansion step
S1105: special playback execution step

BEST MODE FOR CARRYING OUT THE INVENTION

Embodiments of the present invention will be described with reference to the drawings.

First Embodiment

FIG. 1 shows a structure of a BD-ROM (hereinafter also referred to as "BD"). As well as other optical discs such as a DVD and a CD, a BD disc has a recording area that lies spirally from its inner circumference to outer circumference, and includes a logic address space for recording logic data between a lead-in on the inner circumference and a lead-out on the outer circumference. Also, a special area only a drive can read, referred to as a BCA (Burst Cutting Area), lies inside the lead-in. This special area cannot be read from an application, and so the area is often used in copyright protection techniques, for example.

Application data such as video/image data is recorded in the logic address space, with file system information (volume) in the lead. File systems include UDF, ISO9660, and the like, and make it possible to read recorded logic data using a directory and a file structure in like manner with general PCs.

In the present embodiment, the directory and the file structure on the BD disc are set so that a BDVIDEO directory is located immediately below a root directory (ROOT). Data, such as AV content and management information treated in the BD-ROM, is recorded on the BDVIDEO directory.

The following seven types of files are recorded below the BDVIDEO directory.

BD.INFO (a fixed file name) is "BD management information", and is a file storing information relating to a whole BD disc. A BD player reads this file first.

BD.PROG (a fixed file name) is a "BD playback program", and is a file storing a program relating to the whole BD disc.

XXX.PL ("XXX" is variable, and an extension "PL" is fixed.) is "BD management information", and is a file storing PlayList information storing a scenario. This file is provided for each PlayList.

XXX.PROG ("XXX" is variable, and an extension "PROG" is fixed.) is a "BD playback program", and is a file storing a program provided for each PlayList described above. A XXX.PROG file corresponding to a PlayList is identified by the common file body name "XXX".

YYY.VOB ("YYY" is variable, and an extension "VOB" is fixed.) is "AV data", and is a file storing an MPEG stream which is AV data. This file is provided for each VOB.

YYY.VOBI ("YYY" is variable, and an extension "VOBI" is fixed.) is "BD management information", and is a file storing management information relating to a VOB which is AV data. A YYY.VOBI file corresponding to a PlayList is identified by the common file body name "YYY".

ZZZ.PNG ("ZZZ" is variable, and an extension "PNG" is fixed.) is "AV data", and is a file storing image data PNG (an image format standardized by W3C, pronounced "ping") for making up a subtitle and a menu. This file is provided for each PNG image.

Figure 2:
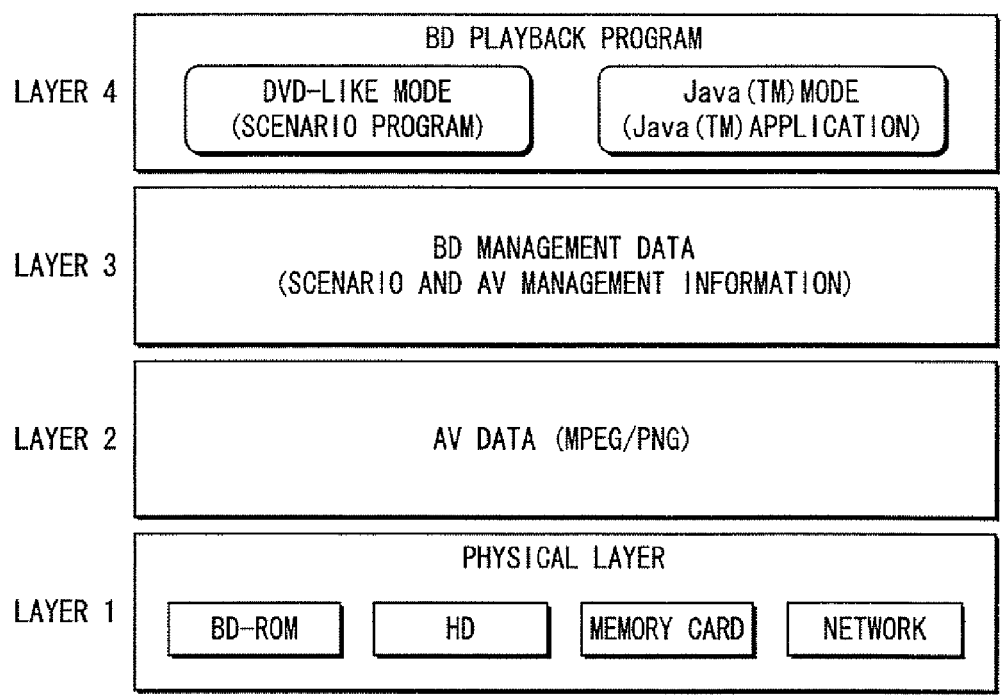
FIG. 2 shows a layer model of software targeted by the BD-ROM in the first embodiment of the present invention.

FIG. 2 shows a layer model of playback control. In FIG. 2, Layer 1 is a physical layer, where control of supplying a stream targeted for processing is performed. As shown in Layer 1, the stream has, as its supply sources, not only a BD-ROM but also various other types of recording and communication media including a HD, a memory card, and a network. Layer 1 performs controls (disc access, card access, and network communication) on these supply sources such as the HD, the memory card, and the network.

Layer 2 is a layer relating to AV data (or an AV stream) making up a digital stream. Layer 2 specifies a decoding format used for decoding a digital stream (hereinafter referred to as a stream) supplied in Layer 1.

Layer 3 (BD management data) is a layer for specifying a static scenario of the stream. The static scenario is playback path information and stream management information specified by a disc creator in advance. Layer 3 specifies playback control based on the static scenario.

Layer 4 (BD playback program) is a layer for realizing a dynamic scenario of the stream. The dynamic scenario is a program that executes at least one of a playback procedure of the AV stream and a control procedure relating to its playback. The playback control by the dynamic scenario changes in accordance with a user operation on the device, and has a property similar to a program. Here, the dynamic playback control has two modes. One of the modes is a mode for playing video data recorded on a BD-ROM in a playback environment specific to AV devices (a DVD-like mode), and the other mode is a mode for enhancing an added value of the video data recorded on the BD-ROM (a Java™ mode). The two modes, the DVD-like mode and the Java™ mode, are defined in Layer 4 shown in FIG. 2. The DVD-like mode is a playback mode in a DVD-like playback environment. A scenario program, having a scenario written thereon to change a progress of playback dynamically, operates in this mode. The Java™ mode is a playback mode based on a Java™ virtual machine, and performs playback according to a Java™ application which is recorded on a recording medium (a BD-ROM is used as an example in the present embodiment) and interpreted and executed by the Java™ virtual machine.

Figure 3A:
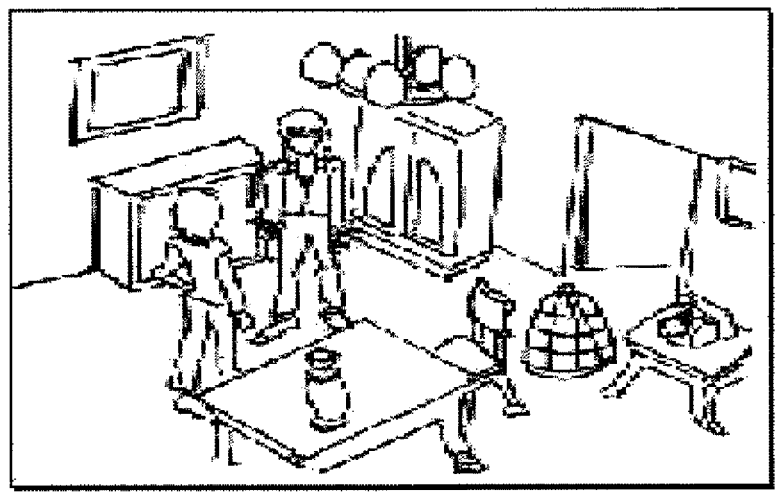
FIG. 3 shows a movie work created by dynamic playback control using two modes.
Figure 3B:
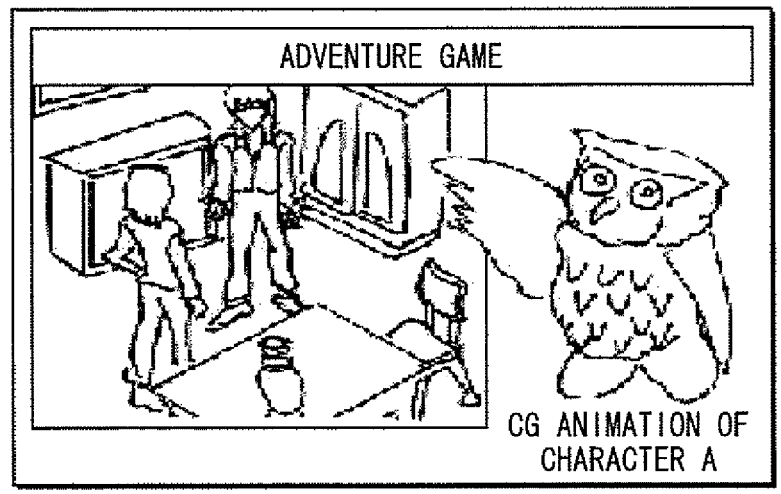

FIG. 3 shows a movie work created by the dynamic playback control in the above two modes. FIG. 3A shows one scene from the movie work created by defining the dynamic playback control in the DVD-like mode. Since the DVD-like mode allows playback control to be written using a command that closely resembles that comprehensible to DVD playback devices, it is possible to specify playback control similar to that used for DVDs, that is, playback control that allows playback to progress in accordance with a selection made on a menu. FIG. 3B shows one scene from the movie work created by defining the dynamic playback control in the Java™ mode. The Java™ mode can be realized using a Java™ program that writes a control procedure in a Java™ language comprehensible to the Java™ virtual machine. When the Java™ program is designed to control movement of computer graphics (CG), such playback control that moves CG (a picture of an owl in FIG. 3B) beside a video display can be realized in the Java™ mode.

FIG. 4 is a block diagram showing a rough functional structure of a playback device. As shown in FIG. 4, the playback device includes a BD-ROM drive 401, a track buffer 402, a demultiplexer 403, a video decoder 404, a video plane 405, an audio decoder 406, an image memory 407, an image plane 408, an image decoder 409, an adder 410, a static scenario memory 411, a dynamic scenario memory 412, a DVD-like module 413, a Java™ module 414, a UO detection module 415, a mode management module 416, a dispatcher 417, a rendering engine 418, special playback information 419, and an AV playback library 420.

The BD-ROM drive 401 performs loading/ejecting of a BD-ROM, and accesses the loaded BD-ROM.

The track buffer 402 is a FIFO memory that stores an ACCESS UNIT read from the BD-ROM on a first-in first-out basis.

The demultiplexer 403 retrieves the ACCESS UNIT from the track buffer 402 and demultiplexes the ACCESS UNIT to obtain video and audio frames constituting a GOP. Then, the demultiplexer 403 outputs the video frame to the video decoder 404, and outputs the audio frame to the audio decoder 406. The demultiplexer 403 also stores a subpicture stream in the image memory 407, and stores Navigation Button information in the dynamic scenario memory 412. The demultiplexion performed by the demultiplexer 403 includes conversion processing for converting TS packets into PES packets.

The video decoder 404 decodes the video frame outputted from the demultiplexer 403 and writes an uncompressed picture to the video plane 405.

The video plane 405 is a memory for storing the uncompressed picture.

The audio decoder 406 decodes the audio frame outputted from the demultiplexer 403 and outputs uncompressed audio data.

The image memory 407 is a buffer for storing the subpicture stream, PNG data in the Navigation Button information, and an image file, which are read from the BD-ROM.

The image plane 408 is a memory having an area for one screen, where the expanded subpicture stream, PNG data, and image file are to be arranged.

The image decoder 409 expands the subpicture stream, the PNG data, and the image file stored in the image memory 407, and writes these to the image plane 408. Various menus and subpictures appear on the screen as a result of decoding the expanded subpicture stream.

The adder 410 composites the image expanded on the image plane 408 with the uncompressed picture data stored on the video plane 405, and outputs a result. By compositing the image in the image plane 408 with the picture in the video plane 405, the adder 410 outputs the image display shown in FIG. 3B, i.e., the screen display in which the CG (the picture of the owl in FIG. 3B) moves beside the video display.

The static scenario memory 411 is a memory for storing current PL information and current stream management information. The current PL information is PL information that is currently processed among a plurality of pieces of PL information recorded on the BD-ROM. The current stream management information is stream management information that is currently processed among a plurality of pieces of stream management information recorded on the BD-ROM.

The dynamic scenario memory 412 is a memory for storing a current dynamic scenario, and is used by the DVD-like module 413 and Java™ module 414. The current dynamic scenario is a dynamic scenario currently processed among a plurality of scenarios recorded on the BD-ROM that are included in the scenario program.

The DVD-like module 413 is a DVD virtual player to be an execution subject of the DVD-like mode, and executes the current scenario program read to the dynamic scenario memory 412.

The Java™ module 414 is a Java™ platform, and includes the Java™ virtual machine, a configuration, and a profile (not shown in the figure) interpreting and executing the Java™ application. The Java™ module 414 generates a current Java™ object from a Java™ class file program constituting the Java™ application read by a program recording memory 1, and executes the current Java™ object. The Java™ virtual machine converts the Java™ object written in the Java™ language into a native code of a CPU in the playback device, and has the CPU execute the native code.

The UO detection module 415 detects a user operation performed on a remote controller or a front panel of the playback device via input means, and outputs information indicating the detected user operation (hereinafter referred to as "UO") to the mode management module 416.

The mode management module 416 retains a mode management table read from the BD-ROM, and performs mode management and branch control. The mode management performed by the mode management module 416 is module assignment, namely designation of which of the DVD-like module 413 and the Java™ module 414 executes a dynamic scenario.

The dispatcher 417 selects only UOs appropriate to a current mode of the playback device, and passes the selected UOs to a module for executing the mode. For example, if UOs such as "left", "right", "up", "down" or "activate" are received during the DVD-like mode, the dispatcher 417 outputs these UOs to the DVD-like module 413.

The rendering engine 418 has infrastructure software such as Java 2D™ and OPEN-GL, and renders CG according to an instruction from the Java™ module 414 and outputs the rendered CG to the image plane 408.

The special playback information 419 contains a list of playback rates supported by the playback device as special playback information. The list is represented using real parameters (immediate values) specific to the playback device, such as 2.0, 10.0, and 30.0. The special playback information is referenced by the Java™ module 414 to ensure compatibility with the DVD-like mode when performing special playback in the Java™ mode.

The AV playback library 420 executes an AV playback function and a PlayList playback function in accordance with a function call from the DVD-like module 413 or the Java™ module 414. The AV playback function is a group of functions similar to that found in DVD players and CD players, including processes such as playback start "Play", playback stop "Stop", playback pause "Pause-On", pause release "Pause-Off", still image release "Still-Off", forwarding at a rate specified by an immediate value "Forward Play (rate)", rewinding at a rate specified by an immediate value "Backward Play (rate)", audio switching "Audio Change", subpicture switching "Subpicture Change", and angle switching "Angle Change". The PlayList playback function is a function for performing "Play" and "Stop" among these AV playback functions, according to PlayList information. The AV playback library 420 changes a reading rate from the track buffer 402 in accordance with an immediate value of a playback rate specified by the DVD-like module 413 or the Java™ module 414, controls the demultiplexer 403 in accordance with the reading rate to retrieve video data, and to transmit the retrieved video data to the video decoder 404. Likewise, the AV playback library 420 controls the demultiplexer 403 to retrieve audio data, and to transmit the retrieved audio data to the audio decoder 406. This enables special playback to be performed at the playback rate specified by the immediate value.

This concludes the description of the construction elements of the playback device.

Figure 5:
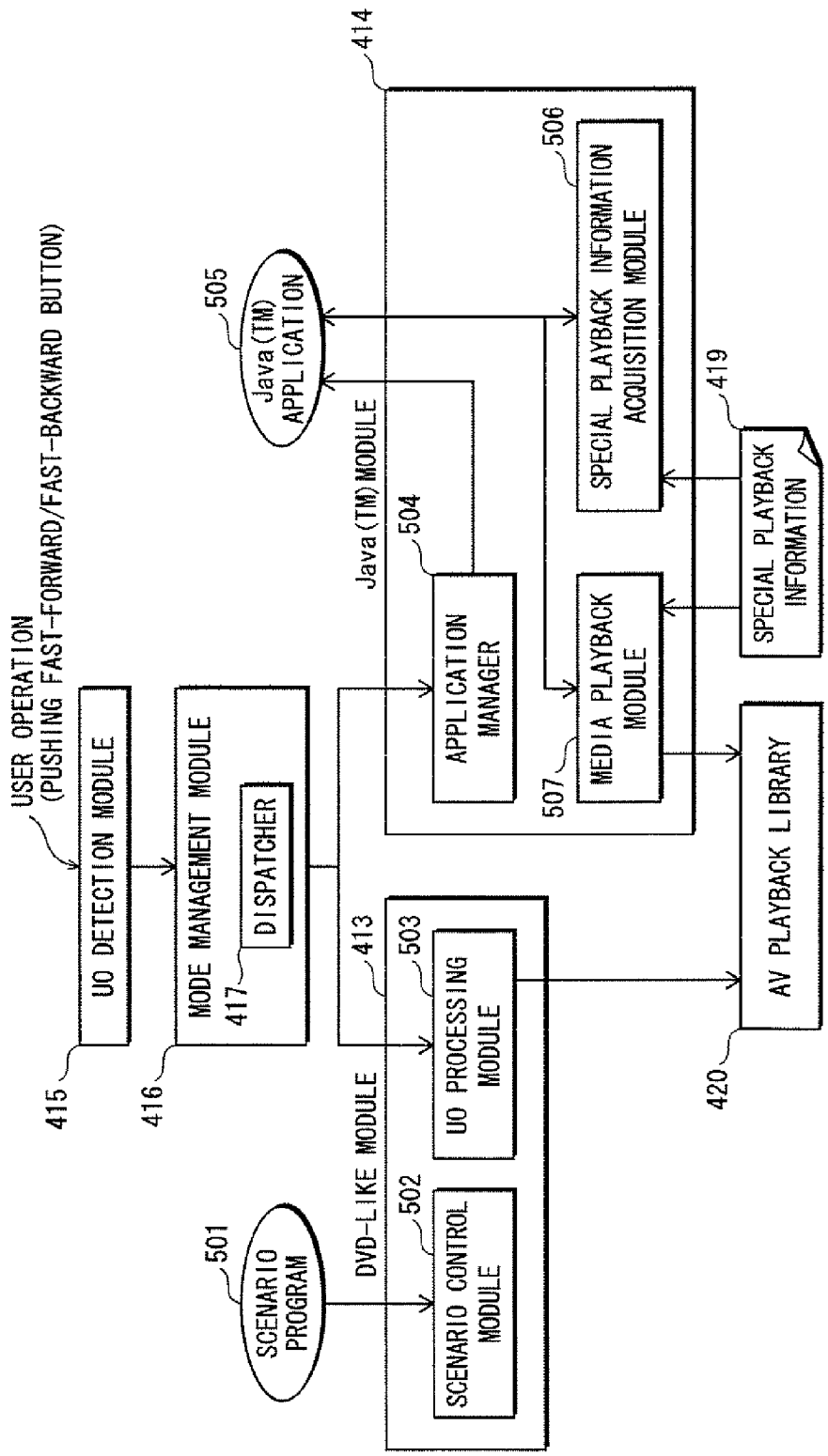
FIG. 5 is a block diagram concerning processing of a user operation relating to a special playback operation in the first embodiment of the present invention.

FIG. 5 is a block diagram showing detailed constructions of the DVD-like module 413 and the Java™ module 414 shown in FIG. 4, and relates to processing of a user operation for a special operation such as fast-forward and fast-backward. Firstly, playback and special playback control by the DVD-like module 413 will be described. A scenario program 501 is a BD playback program recorded on the BD-ROM for the DVD-like mode, and is stored in the dynamic scenario memory 412 shown in FIG. 4. The scenario program 501 stored in the dynamic scenario memory 412 is supplied to the DVD-like module 413. The scenario program 501 calls a scenario control function, being a function to be provided from a scenario control module 502 to an application, to branch a PlayList depending on a condition. Regarding processing performed on a remote-control operation by the user, a UO processing module 503 performs special playback such as fast-forward playback and fast-backward playback, in accordance with a UO event received from the dispatcher 417.

In the Java™ mode, during playback of a corresponding BD title, a Java™ application 505 recorded on the BD-ROM controls a scenario and special playback, using an API (Application Program Interface), which is a function that a media playback module 507 provides to the application. When the user operates the remote controller, an application manager 504 receives a UO event from the dispatcher 417 and passes the received UO event to the Java™ application 505 currently under operation.

When a UO event such as a pushing of a fast-forward button occurs, the Java™ application 505 acquires the special playback information via a special playback information acquisition module 506, and specifies a playback rate at which special playback is to be performed. Which is to say, the Java™ application 505 reads playback rates used in the DVD-like mode and playback rates supported by the terminal from the special playback information, and specifies an appropriate playback rate to the media playback module 507 based on these information. Also, the Java™ application 505 continuously calculates graphics so as to move (or change) in accordance with the playback rate specified using the special playback information acquired via the special playback information acquisition module 506, and then directs the rendering engine 418 to render the calculated graphics. Consider the case of playing back a graphics object, which changes by a predetermined amount (for example, an amount of change in coordinate value per unit time when specifying movements of graphics using coordinates shown by a virtual two-dimensional (or three-dimensional) coordinate axes) per unit time (for example, 0.1 seconds) during normal playback of AV data, at a playback rate of 5 times. This being the case, an amount of change per unit time (0.1 seconds in this example) is calculated by multiplying the predetermined amount by the playback rate (5 times in this example). Having calculated in this way, the Java™ application 505 directs the rendering engine 418 to render the graphics.

FIG. 6 shows special playback information corresponding to playback information retained in the playback device. The special playback information includes a list of playback rates supported by the terminal (namely, the playback device) and information of a playback rate used in the DVD-like mode. Also, information to be a trigger of an operation of special playback is written in the special playback information. The trigger of the special playback includes a button operation by the user. In this case, information such as an ID of the button and a pushing count of the button, corresponding to the special playback, are written in the special playback information.

The list shown in FIG. 6 concerns fast-forward playback, fast-backward playback, slow-forward playback, and slow-backward playback. However, note that information of other special playback operations, for example, skip playback skipping several seconds, may be included in the list, too. In a case of the skip playback, the number of seconds, instead of the playback rate, is written in a terminal support rate field in the list. It is not necessary to write all the number of seconds supported by the terminal, so long as a value used in the DVD-like mode is written in the field. Although the present embodiment uses the example of special playback whose playback rate changes, the present embodiment can be also applied to special playback using a time as a parameter (for example, skip playback skipping 15 seconds).

Having received this special playback information, the application renders the character (computer graphics) as shown in FIG. 3B using the special playback information. As a result, even if the AV playback library 420 performs playback at a playback rate specific to the terminal, the character (computer graphics) can be rendered so as to synchronize with such playback. That is, both of the image of AV data and the motion of the image displayed by the computer graphics change to the same extent. In the example in FIG. 3B, when performing special playback (for example, fast-forward playback), a fast-forward image of the AV data is displayed whereas the image of the owl moves corresponding to the fast-forward image.

FIG. 7 is a flowchart showing processing for performing special playback triggered with the user operation. When the user operates the remote controller or the front panel of the playback device to perform a key operation such as pushing the fast-forward button, the UO detection module 415 detects the key operation by the user (S701). The UO detection module 415 sends an event corresponding to the key operation by the user to the mode management module 416. The mode management module 416 judges whether a current mode is the Java™ mode or the DVD-like mode (S702). If the current mode is the DVD-like mode, the dispatcher 417 within the mode management module 416 sends a UO event to the UO processing module 503 of the DVD-like module 413 (S703). The UO processing module 503 performs playback control corresponding to the received UO event (S704).

If the current mode is the Java™ mode, the dispatcher 417 sends the UO event to the application manager 504 within the Java™ module 414 (S705). Upon receiving the UO event, the application manager 504 sends the received UO event to the Java™ application 505 currently under operation in a virtual machine (not shown in the figure) in the Java™ module 414 (S706). Upon receiving the UO event, the Java™ application 505 acquires the special playback information of the playback device via the special playback information acquisition module 506 (S707). Based on the special playback information, the Java™ application 505 performs special playback control corresponding to the received UO event via the media playback module 507 (S708). For example, if the received UO event is a fast-forward button pushing event, the Java™ application 505 counts how many times the fast-forward button has been pushed continuously, and specifies a playback rate when the button has been pushed once or twice based on the special playback information. In the flowchart shown in FIG. 7, after acquiring the UO event, the Java™ application 505 acquires the special playback information. However, the Java™ application 505 may load the special playback information beforehand, for example, upon start-up. Also, the Java™ application 505 may retain the loaded information.

Figure 8:
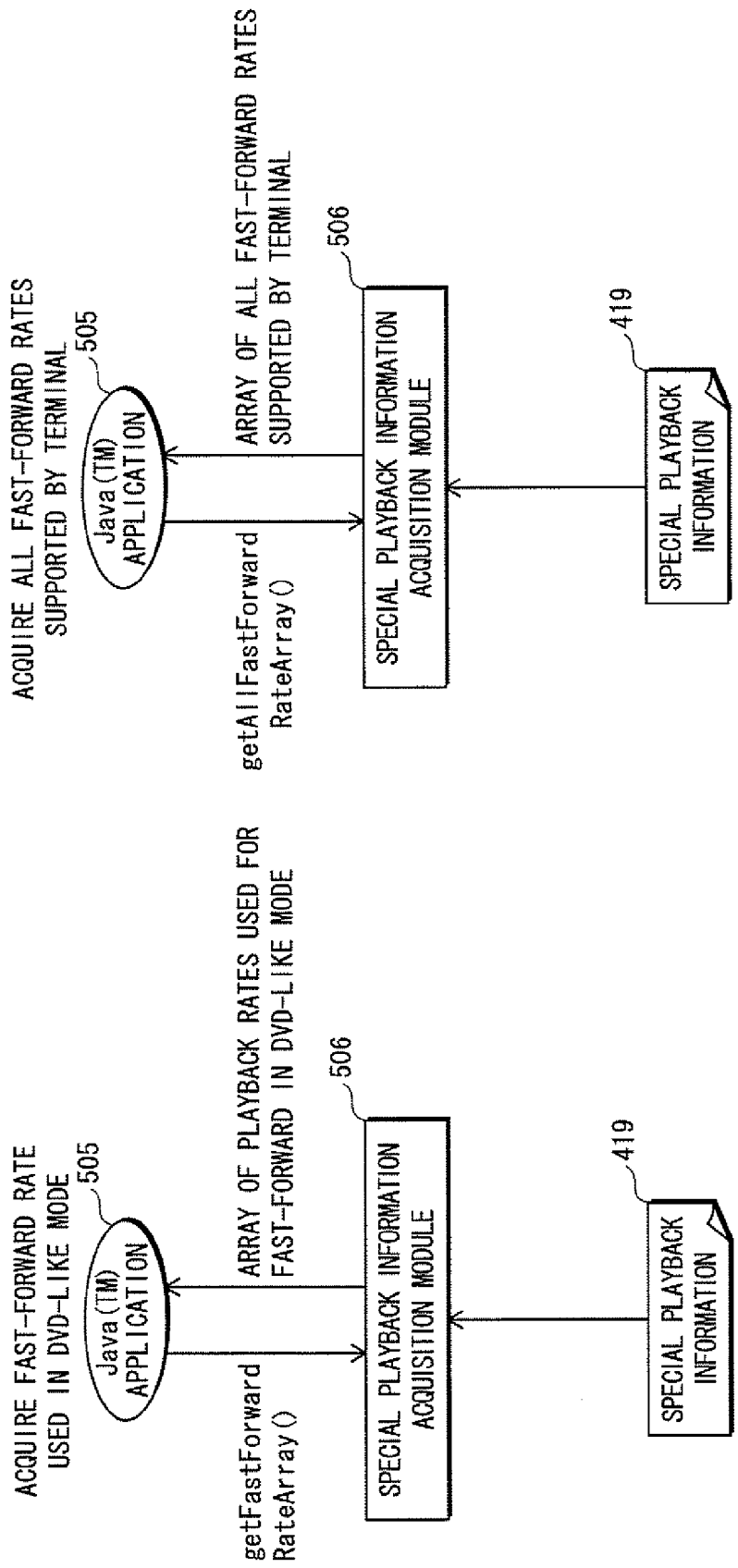
FIG. 8 shows a situation where a Java™ application acquires the special playback information in the first embodiment of the present invention.

FIG. 8 shows a situation where the Java™ application 505 acquires special playback information. As shown in FIG. 6, the special playback information 419 retained in the playback terminal (namely, the playback device) contains the special playback information used in the DVD-like mode and the special playback information supported by the terminal.

The special playback information acquisition module 506 provides the function in response to a call from an application, and releases an API for providing two types of information among the special playback information retained in the playback device, to the application. The two types of information consist of the special playback information used in the DVD-like mode and the special playback information supported by the terminal.

As one example API to be released, in order to reference a list of fast-forward rates used in the DVD-like mode, the Java™ application 505 calls a method, getFastForwardRateArray( ), to the special playback information acquisition module 506. The Java™ application 505 can acquire an array of fast-forward rates used in the DVD-like mode as a return value from the special playback information 419. The acquired array of fast-forward rates is arranged according to the pushing count of the button, such that a rate corresponding to one push is placed first, and a rate corresponding to two pushes is placed second.

Likewise, a list of fast-forward rates supported by the terminal can be acquired by calling a method, getAllFastForwardRateArray( ). The acquired array of fast-forward rates is arranged in ascending order, for example.

The API shown in FIG. 8 is just one example, and there are various forms of APIs, which can acquire special playback information of the DVD-like mode and special playback information supported by the terminal from the Java™ application. For example, instead of the API returning the array of fast-forward rates, an API, which specifies a pushing count of the fast-forward button and returns a value corresponding to the count, may be used.

Figure 9:
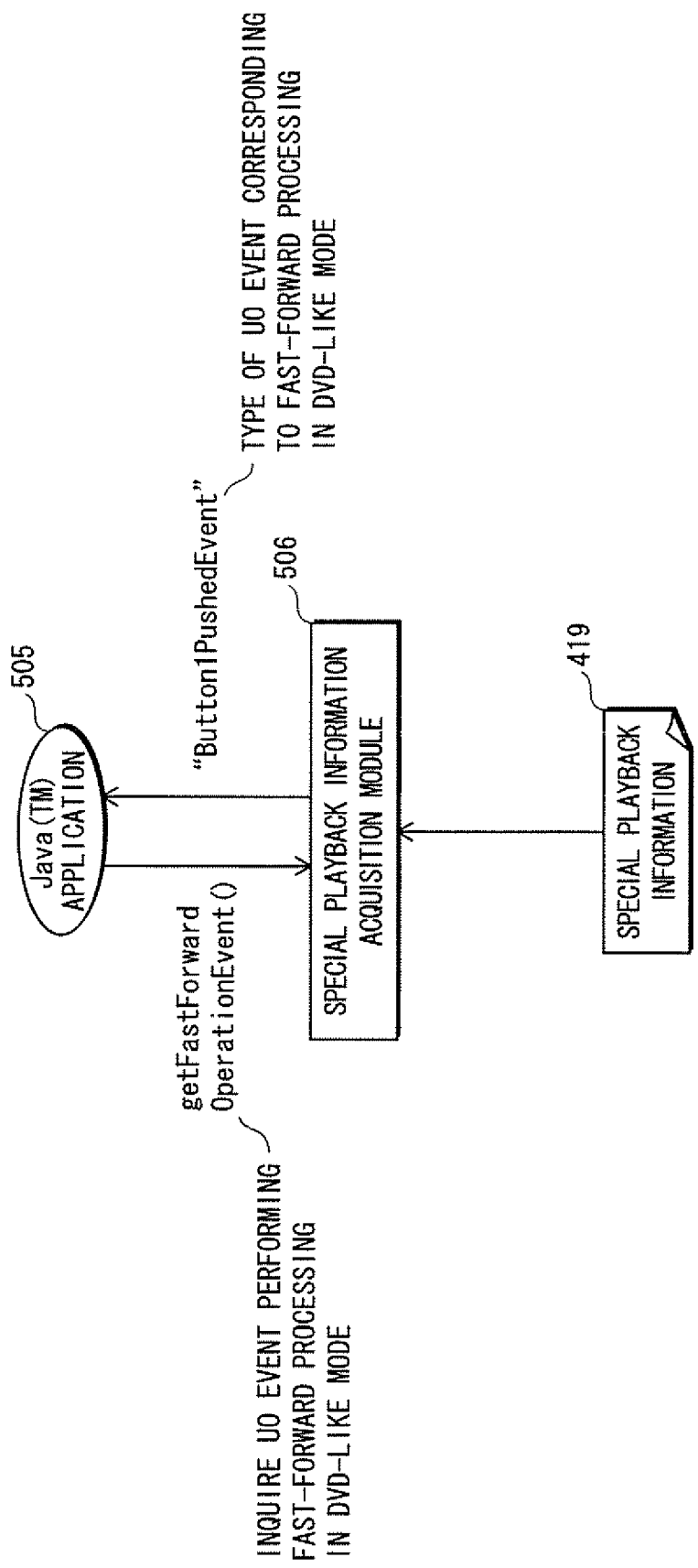
FIG. 9 shows a situation where the Java™ application acquires a type of key event corresponding to the special playback operation from the special playback information in the first embodiment of the present invention.

FIG. 9 shows a situation where the Java™ application 505 acquires a type of a key event corresponding to the special playback operation, from the special playback information acquisition module 506. When the Java™ application 505 inquires a type of a key event to be a trigger of each special playback operation to the special playback information acquisition module 506, the special playback information acquisition module 506 returns the type of the key event corresponding to the DVD-like mode, among the special playback information 419 retained in the playback device, to the Java™ application 505. For example, the Java™ application 505 calls a method, getFastForwardOperationEvent( ), to the special playback information acquisition module 506 to inquire to the special playback information acquisition module 506, the a type of a key event to be a trigger of a fast-forward operation special playback information acquisition module 506 returns the type of the key event "Button1PushedEvent" to the Java™ application 505. By performing fast-forward when receiving an instance of Button1PushedEvent from the application manger 504, the Java™ application 505 can perform processing compatible with the DVD-like mode.

Figure 10:
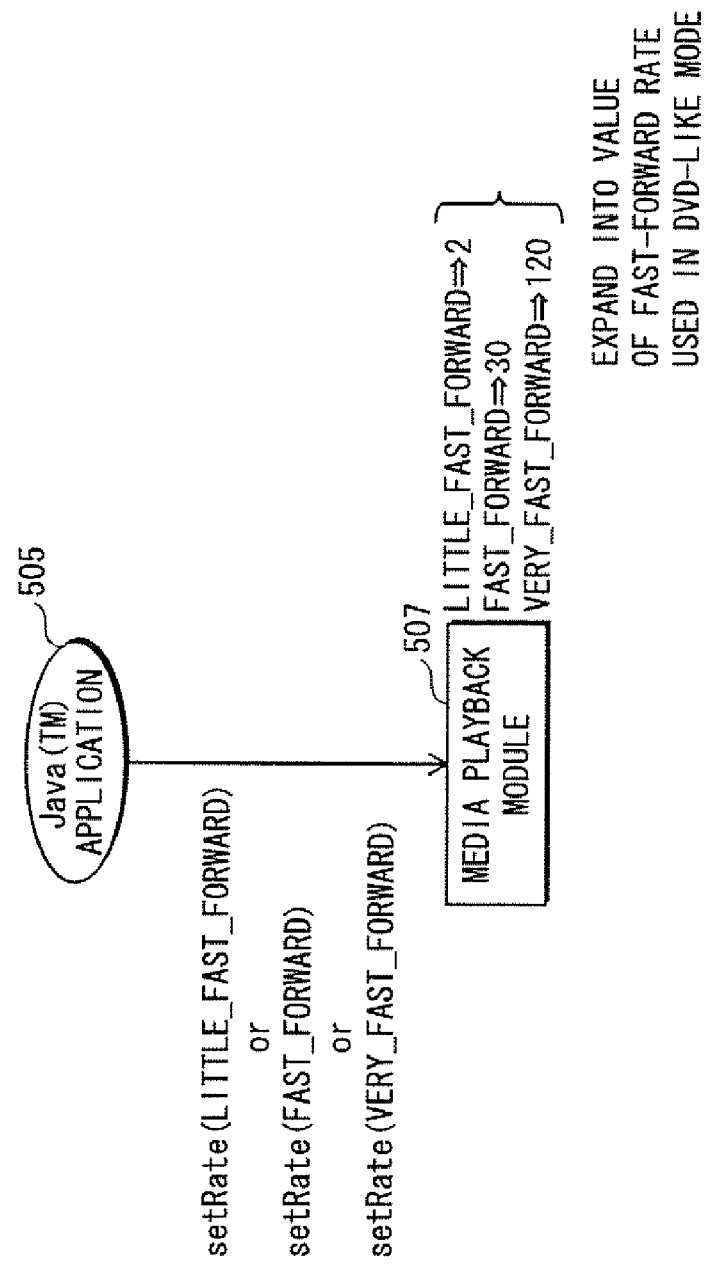
FIG. 10 shows a situation where the Java™ application specifies a playback rate for special playback using a terminal dependent variable in the first embodiment of the present invention.

FIG. 10 shows a situation where the Java™ application 505 specifies a playback rate for special playback using a terminal dependent variable. The terminal dependent variable is such a variable that a value corresponding to the variable is dependent specifically on the terminal. For example, supposed that a terminal dependent variable X exists. If a playback rate corresponding to X is specified as 5 in one terminal, X is expanded into 5. If the playback rate corresponding to X is specified as 10 in another terminal, X is expanded into 10. When performing special playback, the Java™ application 505 specifies a rate using this terminal dependent variable instead of an immediate value. For example, the Java™ application 505 calls a method, setRate (FAST_FORWARD), to the media playback module 507, FAST_FORWARD is expanded into an immediate value within the media playback module 507 depending on terminals. In the case where a playback rate in the DVD-like mode of one playback device changes to twice, 30 times, and 120 times in accordance with the fast-forward button operation (for example, the pushing count of the button or a pushing duration of the button), FAST_FORWARD is expanded into the following immediate values respectively.
  LITTLE_FAST_FORWARD→2,
  FAST_FORWARD→30,
  VERY_FAST_FORWARD→120
Likewise, in the case where a playback rate in the DVD-like mode of another playback device changes to 5 times, 10 times, and 30 times, FAST_FORWARD is expanded into the following immediate values respectively.
  LITTLE_FAST_FORWARD→5,
  FAST_FORWARD→10,
  VERY_FAST_FORWARD→30, That is, exactly the same Java™ application can change a playback rate in accordance with the DVD-like mode depending on terminals. The media playback module 507 expands the terminal dependent variable by performing direct reference to the special playback information 419 retained in the playback device, or via the special playback information acquisition module 506. Also, information relating to the expanded playback rate is passed to the Java™ application 505. The Java™ application 505 continuously calculates the graphics so as to move (or change) in accordance with the specified playback rate, and then directs the rendering engine 418 to render the calculated graphics.

Figure 11:
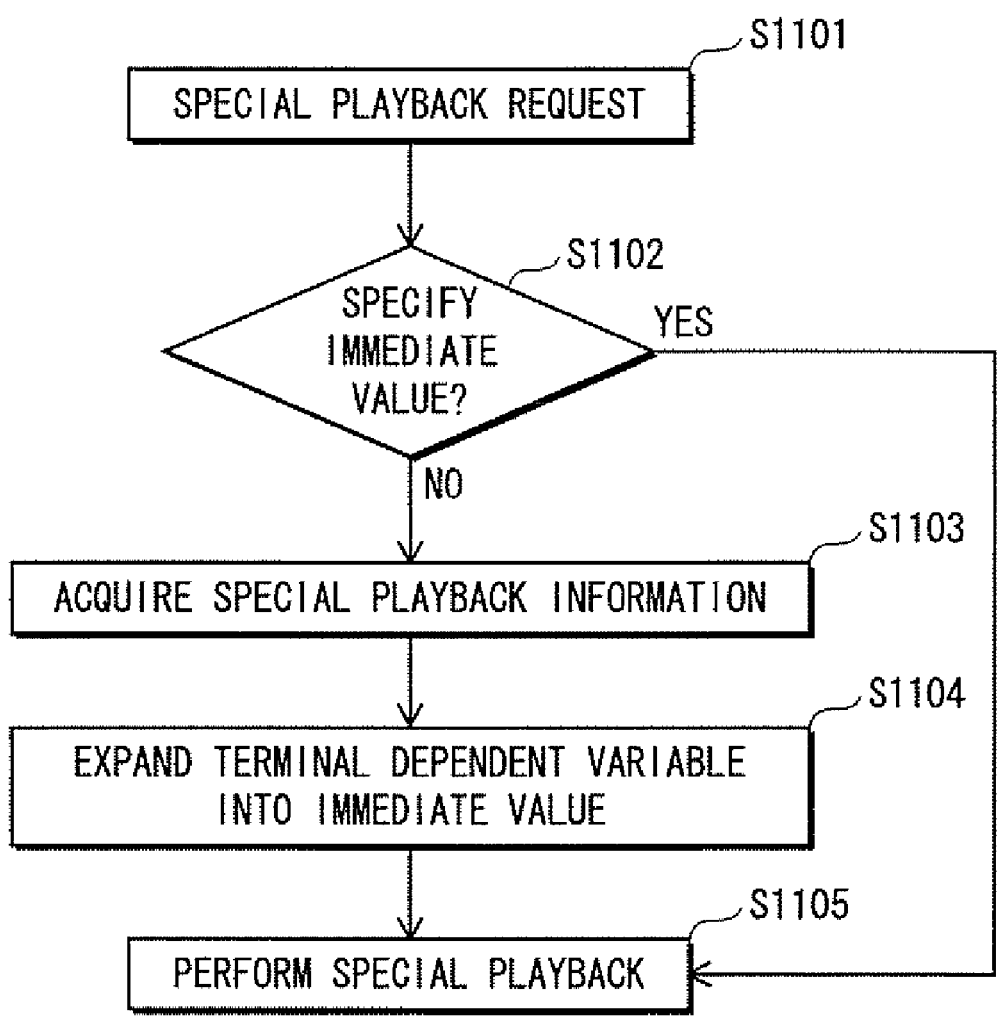
FIG. 11 is a flowchart showing processing in response to a special playback request from the Java™ application.

FIG. 11 is a flowchart showing processing in response to a special playback request from the Java™ application. Upon receiving a special playback request from the Java™ application (S1101) the media playback module 507 judges whether a playback rate specified by the Java™ application is an immediate value or a rate using a terminal dependent variable (S1102). If the specified playback rate is the immediate value, the media playback module 507 performs special playback using the immediate value (S1105). If the specified playback rate is not the immediate value but the rate using the terminal dependent variable, the media playback module 507 references the special playback information 419 retained in the playback device (S1103), and expands the terminal dependent variable into an immediate value based on the referenced special playback information 419 (S1104). The media playback module 507 then calls a special playback function using the expanded immediate value in S1104 as an argument to the AV playback library 420, to perform special playback (S1105).

According to the present embodiment as described above, the special playback information used in the DVD-like mode can be acquired from the Java™ application. Therefore, a special playback operation similar to that in the DVD-like mode can be realized in the Java™ mode. Furthermore, the special playback information supported by the playback device can be acquired, too. This prevents the Java™ application (more specifically, the Java™ application in execution by the Java™ module 414) from requesting a playback rate unsupported by the playback device, thereby causing an unexpected problem. That is, the Java™ application can require special playback at a rate in accordance with a performance level of the playback device. Furthermore, by specifying a playback rate using a terminal dependent variable, the Java™ application can realize special playback compatible with the DVD-like mode in accordance with the performance level of the playback device, without applying a change in accordance with each playback device to the Java™ application. That is, when performing special playback of a digital stream, the Java™ application can render an image in accordance with each playback rate.

Second Embodiment

The first embodiment described the maintenance of the compatibility of the special playback between the DVD-like mode and the Java™ mode. A second embodiment will describe a method for changing a special playback operation while maintaining compatibility of special playback between applications in the Java™ mode.

Figure 12:
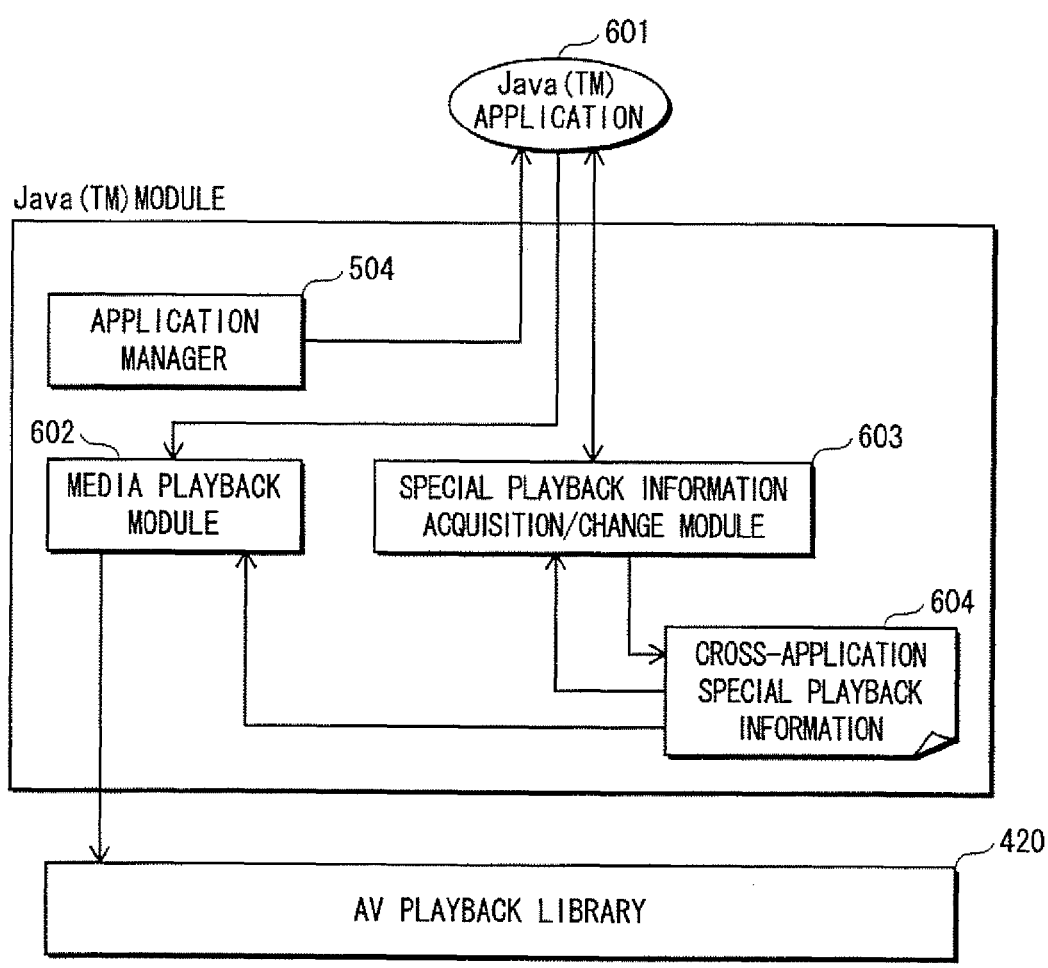
FIG. 12 shows a structure of a Java™ module in a second embodiment of the present invention.

FIG. 12 shows a structure of a Java™ module according to the second embodiment. Cross-application special playback information 604 corresponding to playback information is retained within the Java™ module. A Java™ application 601 can read and write the cross-application special playback information 604 using a special playback information acquisition/change module 603. A media playback module 602 controls media playback in response to a request from the Java™ application 601. At this time, the media playback module 602 reads the cross-application special playback information 604 directly or via the special playback information acquisition/change module 603, and performs playback control in accordance with the cross-application special playback information 604. If one Java™ application having a write authority to the cross-application special playback information 604 rewrites the cross-application special playback information 6041 all the Java™ applications performing playback control via the media playback module 602 receive an influence of the rewriting. FIG. 13 shows one specific example of the cross-application special playback information 604. The cross-application special playback information 604 consists of a list of variable names and a value of a playback rate corresponding to each variable. The cross-application special playback information 604 is retained within the Java™ module, and can be accessed from applications commonly. Based on the information, the media playback module 602 expands a playback rate variable specified by the Java™ application 601.

For example, when the Java™ application calls a method, setRate (FAST_FORWARD), to the media playback module 602, the media playback module 602 expands the variable, based on the cross-application special playback information 604, to a call, setRate (30.0). The media playback module 602 passes the expanded value of the playback rate (30.0 in this example) to the Java™ application in execution. The Java™ application continuously calculates graphics so as to move (or change) in accordance with the specified playback rate, and then directs the rendering engine 418 to render the calculated graphics.

FIG. 14 shows an influence that is exercised on the Java™ application by a change of the cross-application special playback information. Supposed that a value corresponding to VERY_FAST_FORWARD variable in current cross-application special playback information is 120. If a Java™ application 1401 calls a method, setRate (VERY_FAST_FORWARD), to the media playback module 602, the method is expanded as setRate (120). The Java™ application 1401 specifies an immediate value 120 as a playback rate to call a fast-forward function to the AV library 420. And then, supposed that an Java™ application 1402 having a write authority to the cross-application special playback information receives a request for changing special playback and the like from the user, and changes a value indicated by VERY_FAST_FORWARD to 60 via the special playback information acquisition/change module 603. In this case, if the Java™ application 1401 calls the same method, setRate (VERY_FAST_FORWARD), to the media playback module 602 again, the variable is expanded to setRate (60). As a result, the Java™ application 1401 specifies an immediate value 60 as a playback rate to call the fast-forward function to the AV library 420. Thus, even if the exactly same method is called, the special playback rate is different. Since the change of the cross-application special playback information is applied to all the Java™ applications, a special playback operation in the Java™ mode can be changed consistent in all the Java™ applications including an unknown Java™ application.

Third Embodiment

The second embodiment described the change of the special playback operation consistent in all the Java™ applications in the Java™ mode. A third embodiment will describe change of a special playback operation consistent in two modes, the DVD-like mode and the Java™ mode.

Figure 15:
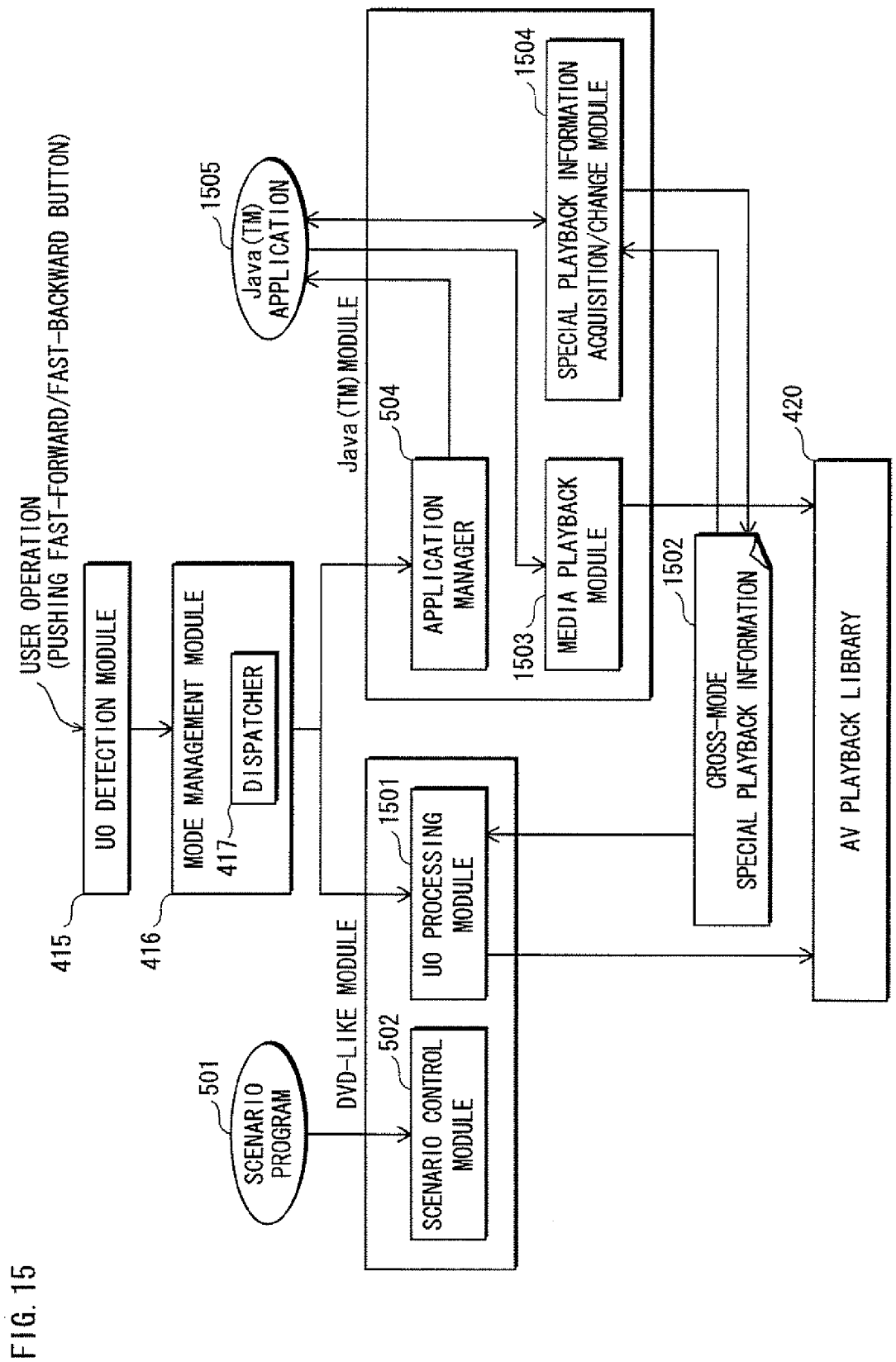
FIG. 15 is a block diagram concerning processing of a user operation relating to a special playback operation in a third embodiment of the present invention.

FIG. 15 is a block diagram concerning processing of a user operation relating to a special playback operation according to the third embodiment. In FIG. 15, cross-mode special playback information 1502 is retained in a position within the playback device, where the DVD-like module and the Java™ module can commonly access. A UO processing module 1501 of the DVD-like module references the cross-mode special playback information 1502 to control playback. In this case, likewise with a Java™ application 1505, a code within the UO processing module 1501 also controls playback using a terminal dependent variable such as setRate (FAST_FORWARD). Since playback control by the Java™ application in the third embodiment is the same as that in the second embodiment, the description is omitted here.

Content to be written in the cross-mode special playback information 1502 is the same as that in the cross-application special playback information shown in FIG. 13. The Java™ application 1505 having a write authority can rewrite the cross-mode special playback information 1502 via a special playback information acquisition/change module 1504. A change of the cross-mode special playback information 1502 exercises an influence on the UO processing module 1501 and a media playback module 1503, and is reflected on a value of an argument that is passed upon a special playback function call to the AV playback library 420.

According to the present embodiment as described above, the change of the special playback operation by the Java™ application can be applied to the DVD-like mode as well as between the Java™ applications in the Java™ mode.

Fourth Embodiment

Figure 16:
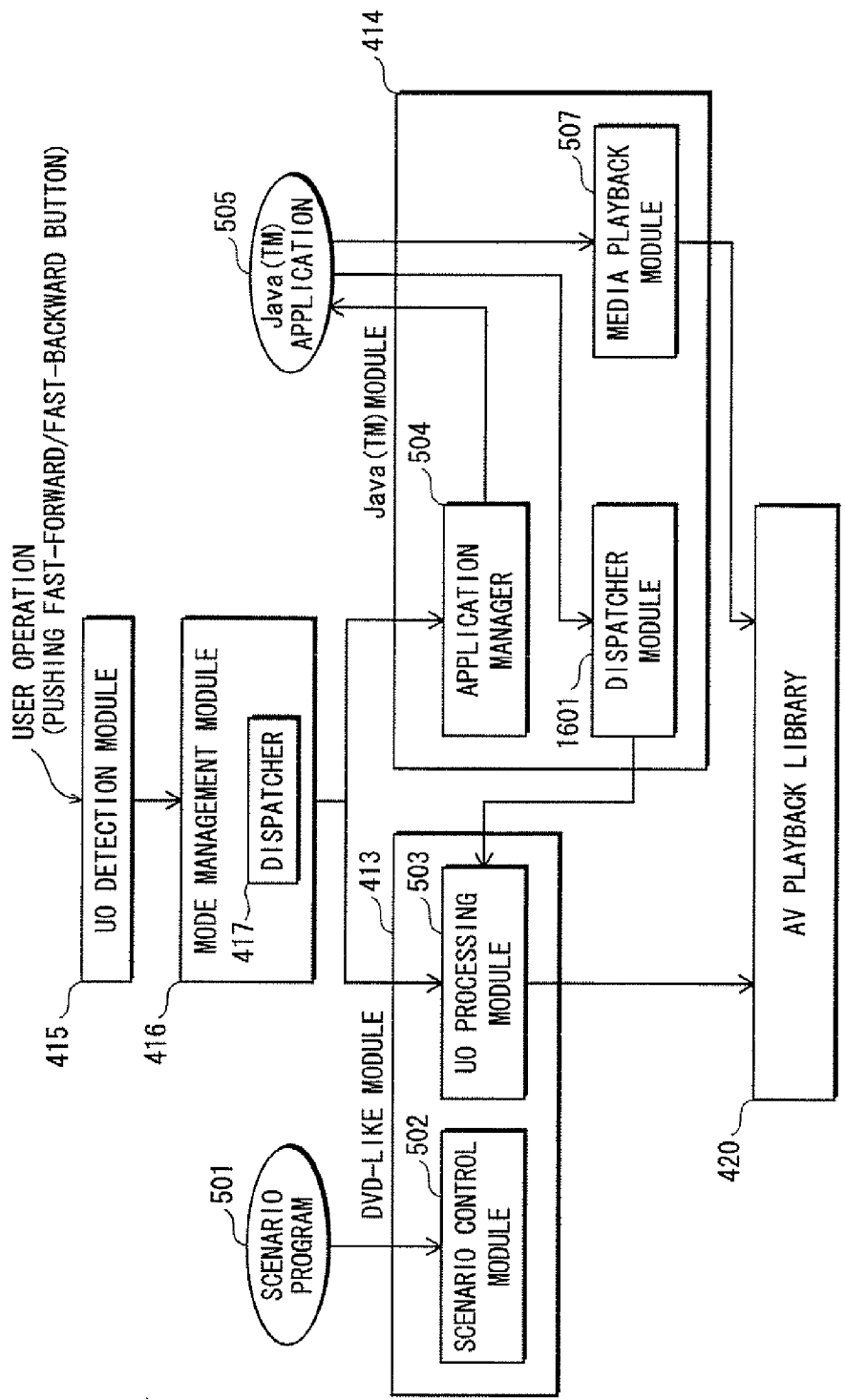
FIG. 16 is a block diagram concerning processing of a user operation relating to a special playback operation in a fourth embodiment of the present invention.

The embodiments from the first to the third described that the compatibility of the special playback operation is maintained by referencing the special playback information retained in the playback device. A fourth embodiment will describe a method for maintaining compatibility of special playback between the Java™ mode and the DVD-like mode without referencing the special playback information. FIG. 16 is a block diagram concerning processing of a user operation relating to a special playback operation according to the fourth embodiment. A new point in FIG. 16 is that a dispatcher module 1601 is added to the Java™ module. The dispatcher module 1601, in response to a request from the Java™ application 505, sends a UO event from the Java™ module to the DVD-like module. A type of the UO event to be sent is the same as that sent from the mode management module 416. Thus, the UO processing module 503 does not need to distinguish whether the UO event is sent from the mode management module 416 or the dispatcher module 1601. That is, it is possible to process the UO event sent from the dispatcher module 1601 in the same manner as the UO event sent from the mode management module 416.

Figure 17:
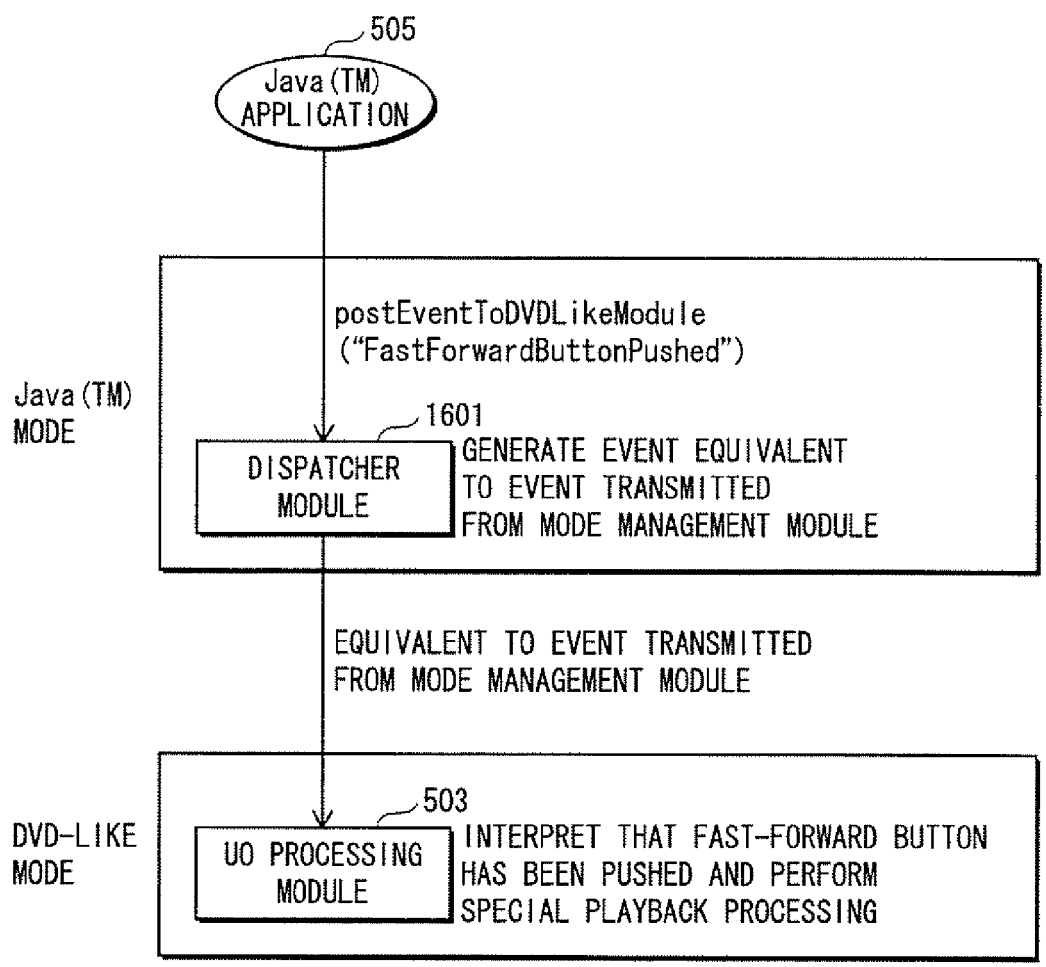
FIG. 17 shows a situation where the Java™ module transmits a UO event to a DVD-like module in the fourth embodiment of the present invention.

FIG. 17 shows a situation where the Java™ module sends the UO event to the DVD-like module. The Java™ application 505 specifies, to the dispatcher module 1601, a type of the UO event to be sent to the DVD-like module. For example, supposed that the Java™ application 505 call a method, postEventToDVLikeModule ("FastForwardButtonPushedEvent"), to the dispatcher module 1601 in order to make a request for sending an event at a time of pushing the fast-forward button. The dispatcher module 1601 generates the specified type of the event, and sends the event to the UO processing module 503 of the DVD-like module. Upon receiving the event, the UO processing module 503 calls a function of the AV playback library 420 at a playback rate used in the DVD-like mode to perform special playback control. According to the present embodiment as described above, the modules in the DVD-like mode need not to be changed particularly. It is possible to perform playback control in the Java™ mode, equivalent to that in the DVD-like mode.

Fifth Embodiment

Figure 18:
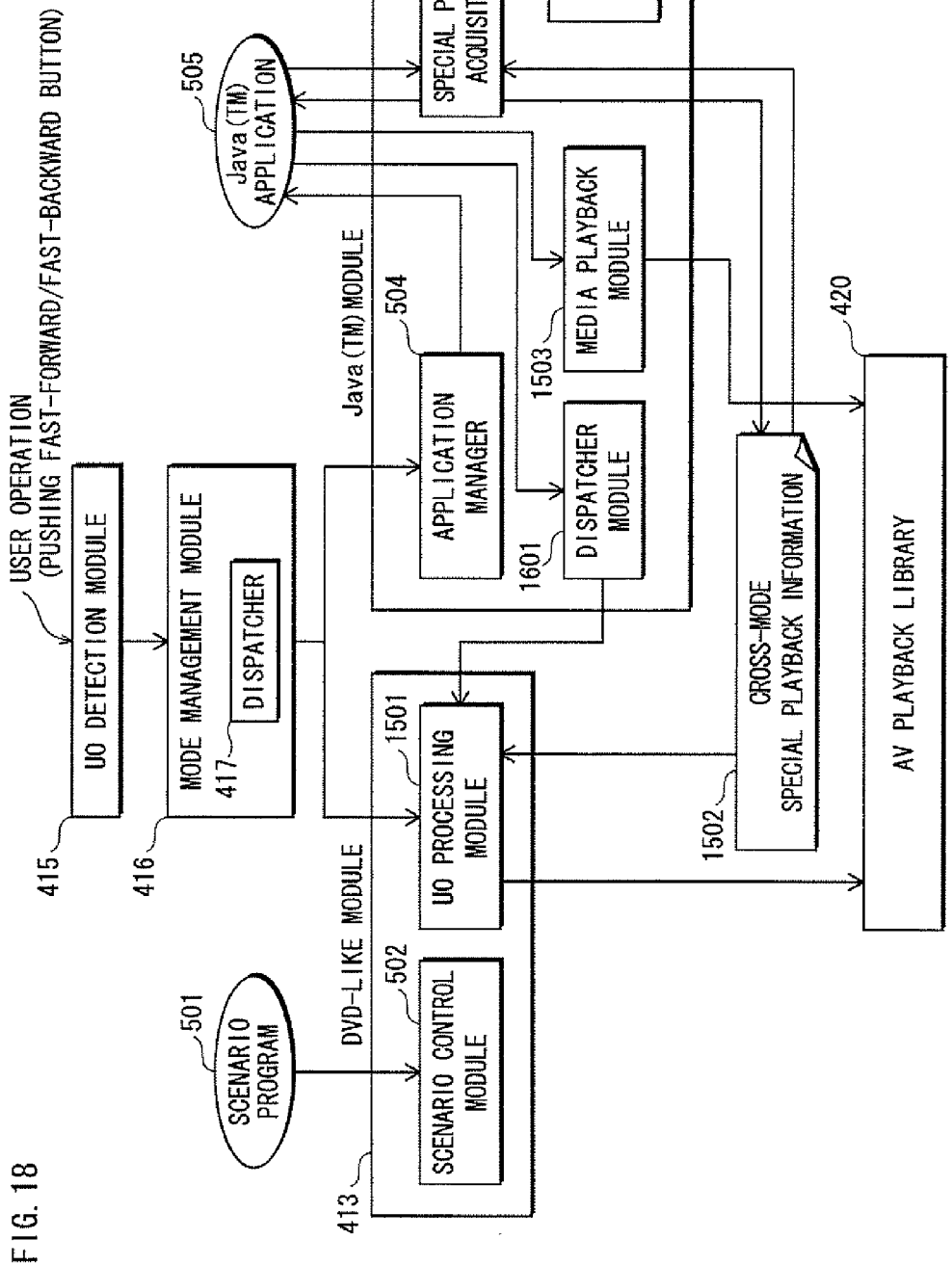
FIG. 18 is a block diagram concerning processing of a user operation relating to a special playback operation in a fifth embodiment of the present invention.

A fifth embodiment will describe maintenance of special playback compatibility where the first to the fourth embodiments are combined. FIG. 18 is a block diagram concerning processing of a user operation relating to a special playback operation according to the fifth embodiment. In FIG. 18, two kinds of the information, the cross-mode special playback information 1502 and the cross-application special playback information 604, are retained in the playback device. The Java™ application 505 can read and write the special playback information using the special playback information acquisition/change module 1504. By rewriting the cross-application special playback information 604, the Java™ application 505 can change the special playback operation only in the Java™ mode. By rewriting the cross-mode special playback information 1502, the Java™ application 505 can change the special playback operation in the both modes.

A terminal dependent variable such as FAST_FORWARD has a different variable name or package between the cross-mode special playback and the Java™ common special playback. For example, FAST_FORWARD is used for the cross-mode special playback, whereas J_FAST_FORWARD is used for special playback common in the Java™ mode. By changing a terminal dependent variable to specify, the Java™ application 505 can select to perform whether the special playback operation common in the both modes or the special playback operation common in the Java™ mode. To have a module in the DVD-like mode perform the special playback operation, the Java™ application sends a UO event to the UO processing module 1501 within the DVD-like module using the dispatcher 1601. Then, the UO processing module 1501 calls the AV playback library 420 using a value of a playback rate of the cross-mode special playback information, and performs special playback.

According to the present embodiment as described above, the Java™ application 505 can select to perform whether the special playback operation common in the Java™ mode or the special playback operation common in the both modes, namely the DVD-like mode and the Java™ mode. The Java™ application 505 can change the special playback operation consistent in the both modes or the special playback operation consistent in the Java™ mode.

INDUSTRIAL APPLICABILITY

According to the present invention, compatibility of a special playback operation can be maintained in a playback device having a plurality of playback modes. Therefore, the playback device of the present invention is highly applicable in movie and consumer appliance industries that are engaged in production of video content.

The invention claimed is:
1. A playback device for playing back a digital stream and an application in conjunction with each other, comprising:
a drive unit operable to load a recording medium;
a playback unit operable to play back a digital stream recorded on the loaded recording medium; and
a platform unit operable to execute an application recorded on the loaded recording medium to perform playback control, wherein
the playback unit has a plurality of real parameters used for special playback control, the plurality of real parameters being specific to the playback device,
the platform unit includes:
an execution unit operable to interpret and execute the application recorded on the loaded recording medium; and
a module unit having a first function of providing the application with one of the real parameters upon request by the application, and a second function of, upon request by the application, which has received the provision of the real parameter, to perform special playback control using the real parameter, controlling the playback unit such that the special playback is performed on the digital stream based on the real parameter used for the request of the special playback control.
2. The playback device of claim 1, wherein
the first function is a function of supplying special playback information to the application in response to a call from the application in execution, the special playback information showing a correspondence between a plurality of user events and the plurality of real parameters,
the second function is a function of, when a function call is performed by the application using the special playback information, controlling the playback unit such that playback is performed on the digital stream based on the real parameter.
3. The playback device of claim 2, wherein
each of the plurality of user events shows a type of a button pushed by a user, and
each of the plurality of real parameters shows a multiplication factor of a special playback rate.
4. The playback device of claim 3, wherein
each of the plurality of user events further shows a pushing count of the button, and
the special playback information shows a user event including a higher pushing count in correspondence with a real parameter showing a higher multiplication factor.
5. The playback device of claim 1, wherein
the first function is a function of supplying array data listing the plurality of real parameters to the application, in response to a call from the application in execution.
6. The playback device of claim 1, wherein
the execution unit controls rendering of graphics by interpreting and executing the application.
7. The playback device of claim 6, wherein
the first function is a function of supplying special playback information to the application in response to a call from the application, the special playback information showing a correspondence between a plurality of user events and the plurality of real parameters specific to the playback device,
the module unit performs the playback control in response to a function call from the application using the special playback information, and
the application controls the rendering of the graphics based on the special playback information acquired via the function.
8. The playback device of claim 6, wherein
the first function is a function of expanding a variable that corresponds to a special playback rate, received from the application, into one of the plurality of real parameters that corresponds to the special playback rate, and supplying the expanded real parameter to the application, upon request from the application to perform special playback control using the expanded real parameter, the second function controls the playback unit such that the special playback is performed on the digital stream based on the expanded real parameter, and the application controls the rendering of the graphics based on the expanded real parameter.

9. A playback method for use in a playback device for playing back a digital stream and an application in conjunction with each other, comprising:

a playback step of playing back a digital stream recorded on a recording medium loaded on a drive unit included in the playback device; and an execution step of interpreting and executing an application recorded on the loaded recording medium, wherein the playback step has a plurality of real parameters used for special playback control, the plurality of real parameters being specific to the playback device, and the execution step includes:

a substep of providing the application with one of the real parameters upon request by the application; and a substep of, upon request by the application, which has received provision of the real parameter, to perform special playback control using the real parameter, controlling the playback unit such that the special playback is performed on the digital stream based on the real parameter used for the request of the special playback control.

10. A playback device for playing back a digital stream and an application in conjunction with each other, comprising:

a drive unit operable to load a recording medium;

a playback unit operable to play back a digital stream recorded on the loaded recording medium; and a platform unit operable to execute an application recorded on the loaded recording medium to perform playback control, wherein the playback unit has a plurality of real parameters used for special playback control, the plurality of real parameters being specific to the playback device, the playback unit includes:

an execution unit operable to interpret and execute the application recorded on the loaded recording medium; and a module unit having a function of expanding a variable that corresponds to a special playback rate, received from the application, into one of the plurality of real parameters that corresponds to the special playback rate, and a function of controlling the playback unit such that the special playback is performed on the digital stream based on the expanded real parameter.

11. A playback method for use in a playback device for playing back a digital stream and an application in conjunction with each other, comprising:

a playback step of playing back a digital stream recorded on a recording medium loaded on a drive unit included in the playback device; and an execution step of interpreting and executing an application recorded on the loaded recording medium, wherein the playback step has a plurality of real parameters used for special playback control, the plurality of real parameters being specific to the playback device, and the execution step includes:

a substep of expanding a variable that corresponds to a special playback rate, received from the application, into one of the plurality of real parameters that corresponds to the special playback rate; and a substep of controlling the playback unit such that the special playback is performed of the digital stream based on the expanded real parameter.

* * * * *